(12) United States Patent
Wang

(10) Patent No.: US 8,705,647 B2
(45) Date of Patent: Apr. 22, 2014

(54) MAXIMUM-LIKELIHOOD MIMO DEMODULATION FOR FREQUENCY-SELECTIVE CHANNELS

(76) Inventor: Xiao-an Wang, Allentown, PA (US)

( * ) Notice: Subject to any disclaimer, the term of this patent is extended or adjusted under 35 U.S.C. 154(b) by 387 days.

(21) Appl. No.: 13/087,943

(22) Filed: Apr. 15, 2011

(65) Prior Publication Data

US 2012/0263222 A1  Oct. 18, 2012

(51) Int. Cl.
*H04B 7/02*  (2006.01)
(52) U.S. Cl.
USPC ........... 375/267; 375/260; 375/296; 375/299; 375/346; 375/347; 375/349
(58) Field of Classification Search
USPC .......... 375/267, 260, 296, 299, 346, 347, 349
See application file for complete search history.

(56) References Cited

U.S. PATENT DOCUMENTS

| | | | |
|---|---|---|---|
| 2008/0219341 A1* | 9/2008 | Kim | 375/232 |
| 2011/0051795 A1* | 3/2011 | Khayrallah | 375/232 |
| 2011/0103520 A1* | 5/2011 | Molnar | 375/340 |
| 2012/0121002 A1* | 5/2012 | Liu et al. | 375/227 |

* cited by examiner

*Primary Examiner* — Kabir A Timory

(57) ABSTRACT

A method is described that enables maximum-likelihood (ML) demodulation for MIMO communications over frequency-selective channels. An equalizer is typically employed to suppress inter-symbol interference (ISI) due to frequency-selectiveness of the channel, but the noise of the equalizer output can be highly correlated such that standard ML-MIMO demodulations cannot directly apply. The method comprises first constructing equivalent post-equalization MIMO channel and noise covariance matrix, and then de-correlating the equalizer output so that ML or near-ML MIMO demodulations can be applied to improve the performance. Additionally, successive ISI cancellation (SIC) is described for further performance improvement.

12 Claims, 1 Drawing Sheet

MAXIMUM-LIKELIHOOD MIMO DEMODULATION FOR FREQUENCY-SELECTIVE CHANNELS

BACKGROUND

1. Field of Application

The following description relates generally to telecommunications systems and wireless communications systems.

2. Prior Art

Wireless MIMO (multi-input, multi-output) system has been proven to be an effective way to improve the capacity or throughput of a wireless network. For example, an MIMO system with N transmit antennas and N receive antennas can have N-fold improvement over an SISO (single-input, single-output) system. MIMO schemes have been adopted in all major wireless cellular networks, such as 3G ($3^{rd}$ generation) and LTE (long-term evolution of 3G) systems.

While the benefits of MIMO to wireless networks can be huge, the actual performance of an MIMO system depends critically on the design of the MIMO demodulator. A narrowband MIMO system can be modeled as follows:

$$r = Hx + u \quad (1)$$

where x is an M×1 vector representing signals from M transmit antennas with $E\{xx^H\} = (E_S/M)I$, r is an N×1 vector representing received signals from N receive antennas, u is an N×1 vector representing independent, identically distributed (i.i.d.) noises with $E\{uu^H\} = N_0 I$, and H is an N×M matrix representing the MIMO channel.

For the MIMO model in Eq. (1), optimum performance is achieved by maximum-likelihood (ML) demodulation, which seeks the most likely signal vector x given the received vector r. For high data rate applications, both signal size and number of antennas can be so large that ML demodulation becomes infeasible. Suboptimum algorithms for MIMO demodulations exist, such as spherical decoding, that achieves near-ML performance with reasonable complexity. Such suboptimum algorithms are referred to as "near-ML" algorithms or demodulators. On the other hand, a linear MIMO demodulator, such as MMSE (minimum mean square error) demodulator, has the least complexity. But the performance of a linear MIMO demodulator is often many dBs inferior to an ML or a near-ML demodulator.

The MIMO model in Eq. (1) is narrowband. The narrowband MIMO model is applicable to an LTE system that comprises a plurality of subcarriers each of which can be considered to be a narrowband signal. For a network that employs a wideband signal such as CDMA (code-division multiple access), the narrowband MIMO model does not directly apply. This is because the fading in a wideband wireless channel is not flat due to multipaths. The signal may be amplified in certain frequencies and may be in deep fades in some other frequencies. This non-flat fading is referred to as "frequency selective" fading. In time domain this is reflected as the inter-symbol interference (ISI) or inter-chip interference (ICI). Thus for a wideband signal, an equalizer, such as an MMSE equalizer, is typically applied to the signal to minimize the ISI or ICI pri- or to MIMO demodulation. The output of the equalizer is then MIMO-demodulated.

The output of the equalizer can still be modeled as in Eq. (1), but the noise vector u is no longer i.i.d. Instead the noise components in u can be highly correlated. Since the ML or near-ML algorithms are based on the i.i.d. noises, their direct applications to equalized wideband signal may lead to degraded performance, and sometimes the performance can even be worse than direct decision (slicing) on the equalizer output. As a result, a wideband MIMO receiver often employs a linear equalizer to suppress the ISI or ICI, followed by a decision or slicing function to recover the transmitted signal vector x. Since no ML demodulation is used, the performance can be far from optimal. Moreover, using a slicing function after equalization assumes the equivalent MIMO channel H is diagonal, which is generally not true, thus further degrading the performance.

Thus there can be significant potentials for improving the performance of a wideband MIMO receiver, and a strong need exists for a method, system, and apparatus that overcome aforementioned shortcomings.

SUMMARY OF THE INVENTION

The following is a summary of one or more aspects in order to provide a basic understanding of such aspects. A basic aspect relates to using ML demodulation in wideband MIMO systems where equalization has to be performed first to suppress the ISI or ICI. To apply ML or near-ML demodulation on the equalized signal, an equivalent MIMO channel matrix and a noise covariance matrix of the equalizer output will be constructed. Noise de-correlation is then applied to the equalized signal. Much improved performance can be achieved by optimum ML or near-ML demodulations after de-correlation.

Another aspect relates to successive ISI or ICI cancellation such that performance can be further improved.

DETAILED DESCRIPTION

Figure 1:
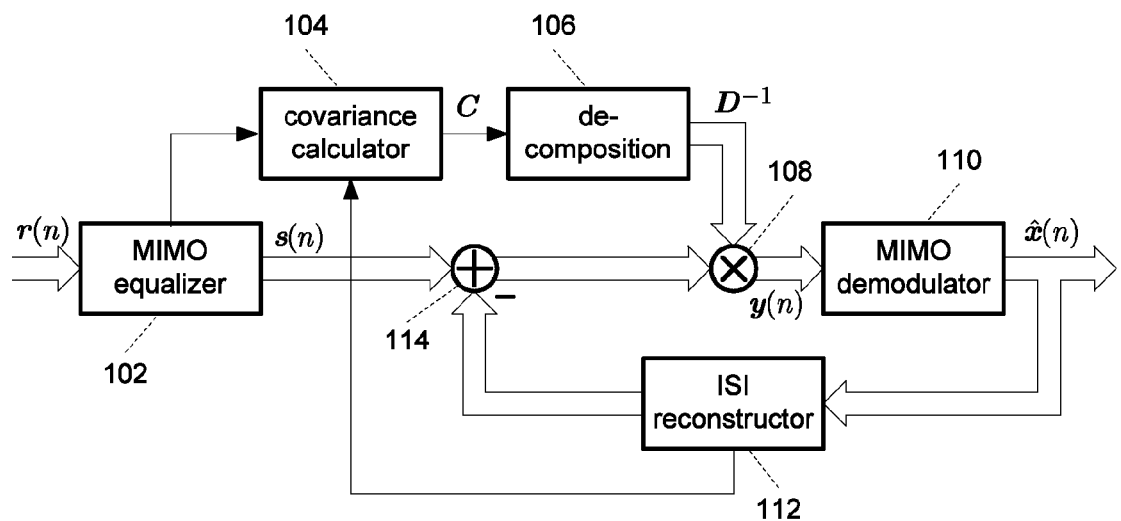
FIG. 1 illustrates an example signal flow of successive ISI cancellation.

Various aspects are now described with reference to the drawings. In the following description, for purposes of explanation, specific details are set forth in order to provide a thorough understanding of one or more aspects. It may be evident, however, that such aspect(s) may be practiced without these specific details.

If an MIMO channel is frequency selective, then element $h_{ij}$ of the channel matrix H in Eq. (1) represents the impulse response of the channel between transmit antenna j and receive antenna i if considered in time domain. Time-domain descriptions will be used hereinafter. It should be noted that frequency-domain descriptions can be derived from time-domain descriptions, and vice versa. The two types of descriptions will lead to the same conclusion.

As utilized herein, terms "chip" and "symbol" are intended to refer to the basic transmission unit in the communications signals. Term "symbol" has been widely used in general communications systems, while term "chip" has been mostly used in the context of CDMA systems. These two terms will be used interchangeably depending on the context. Term "sample" is intended to refer to the basic signal-representation unit. For example, a 2× sampled signal has two samples per symbol.

For a frequency-selective channel with 1× sampling, the received signal can be written as $$r(n) = (H*x)(n) + u(n) \quad (2)$$

where * denotes convolution naturally extended to matrix operations, i.e., the i-th component $r_i(n)$ of r(n) is given by $$r_i(n) = \sum_{k=1}^{M} h_{ik}(n) * x_k(n) + u_i(n) = \sum_{k=1}^{M} (h_{ik} * x_k)(n) + u_i(n) \quad (3)$$

When an equalizer W(n) is employed to suppress ISI, the equalizer output can be written as $$s(n) = (W * r)(n) \quad (4)$$
$$= (W * H * x)(n) + (W * u)(n)$$
$$= (G * x)(n) + (W * u)(n)$$
$$= G(0)x(n) + v(n)$$

where G(n)=(W*H)(n). Equalizer W(n) can be obtained by various design criteria such as MMSE and zero-forcing (ZF). Eq. (4) shows that the equivalent post-equalization MIMO channel is G(0), the equivalent noise vector is v(n), which consists of the residual ISI and the equalizer-filtered noise, and can be written as $$v(n) = \sum_{k \neq 0} G(k)x(n-k) + (W * u)(n) \quad (5)$$

From Eq. (5), the covariance matrix of the "new" noise vector v(n) can be derived as $$C = \frac{E_S}{M} \sum_{k \neq 0} G(k)G^H(k) + N_0 \sum_k W(k)W^H(k) \quad (6)$$

Due to the randomness of MIMO channels, Eq. (6) shows that the covariance matrix C is in general not diagonal, thus direct application of optimum ML or near-ML MIMO demodulation will degrade the performance. In order to apply the ML-type demodulation, the noise will need to be de-correlated first. Noise de-correlation can be performed as follows.

The covariance matrix C can be "square-root" decomposed as $$C = DD^H \quad (7)$$

Square root matrix D of C in Eq. (7) is not unique. Many square-root decomposition approaches exist for obtaining D, for example, Cholesky decomposition. The inverse $D^{-1}$ of the square-root matrix D is referred to as the de-correlation matrix. Apply $D^{-1}$ to Eq. (4):

$$y(n) = D^{-1}s(n) \quad (8)$$
$$= D^{-1}G(0)x(n) + D^{-1}v(n)$$
$$= Fx(n) + z(n)$$

After de-correlation, the covariance matrix of noise vector z(n) is an identity matrix. Accordingly, signal y(n) in Eq. (8) is referred to as the "de-correlated" MIMO signal. The equivalent MIMO channel after de-correlation is $F=D^{-1}G(0)$. ML or near-ML demodulations can now be applied to the de-correlated MIMO signal y(n), which leads to much improved performance over both the post-equalization slicing and the direct application of ML or near-ML demodulation without noise de-correlation.

Successive ISI Cancellation

After ML or near-ML MIMO demodulations, an estimation vector $\hat{x}(n)$ of the symbol vector x(n) can be made. It is then possible to use a sequence of estimates $\hat{x}(n)$ to reconstruct the ISI. If reconstructed ISI is subtracted from Eq. (5), further improvement can be expected. Such an approach of subtracting of the reconstructed ISI from demodulated symbols is referred to as successive ISI cancellation (SIC).

FIG. 1 illustrates an example signal flow of SIC. In the first iteration, MIMO equalizer 102 equalizes incoming signal r(n). Covariance calculator 104 computes the covariance matrix C. Decomposition apparatus 106 square-root decomposes the covariance matrix C such that $C=DD^H$. De-correlation matrix is then $D^{-1}$. De-correlator 108 applies the de-correlation matrix $D^{-1}$ on equalizer output s(n) to obtain y(n) with uncorrelated noise. MIMO demodulator 110 then demodulates transmitted symbol x(n) from y(n) to obtain symbol estimate $\hat{x}(n)$. Note that MIMO demodulator 110 may use ML or near-ML algorithms for improved demodulation performance. ISI reconstructor 112 uses a sequence of estimates $\hat{x}(n)$ to reconstruct ISI.

In the second iteration, the input signal sequence r(n) is processed as in the first iteration. ISI canceller 114 subtracts the reconstructed ISI from equalizer output s(n). The output of ISI canceller 114 is referred to as the post-cancellation signal. Note that in the first iteration the reconstructed ISI can be set to zero. With zero reconstructed ISI, the first iteration then contains all non-SIC operations in foregoing descriptions. The entire process of SIC may consist of two or more iterations.

During SIC iterations, the covariance matrix C of the post-cancellation signal, i.e., the output of ISI canceller 114, may change from iteration to iteration. Referring to Eq. (5), the noise vector v(n) in the post-cancellation signal becomes $$v(n) = \sum_{k \neq 0} G(k)[x(n-k) - \hat{x}(n-k)] + (W * u)(n) \quad (9)$$

and covariance matrix C in Eq. (6) becomes $$C = \sum_{k \neq 0} G(k)C_E G^H(k) + N_0 \sum_k W(k)W^H(k) \quad (10)$$

where $C_E$ is the covariance matrix of ISI cancellation error $x(n-k)-\hat{x}(n-k)$. Several approaches to obtaining an estimate of $C_E$ exist. For example, $C_E$ can be estimated from the correlations between the reconstructed ISI and the equalizer output s(n). Another approach is to assume $C_E$ having a diagonal form, so only the diagonal elements need to be estimated. Alternatively, the diagonal elements can also be obtained empirically. For example, $C_E$ can be modeled as a function of the SNR (signal-to-noise ratio), and its values at a given SNR can be pre-determined from offline simulations. Still another simple approach is to assume perfect cancellation, i.e., $x(n-k)=\hat{x}(n-k)$, in which case $C_E=0$.

The transmitted signal vector x(n) is typically coded with error correction codes. To further reduce the ISI cancellation error, the output $\hat{x}(n)$ of MIMO demodulator 110 can be first de-coded and then re-encoded prior to being utilized for ISI reconstruction.

Applications to CDMA Systems

Figure 2:
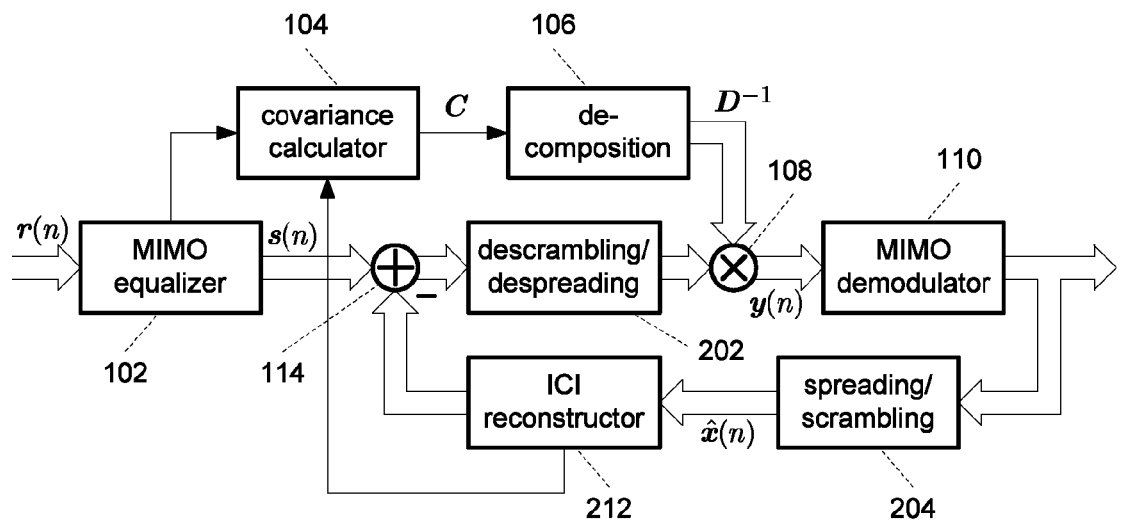
FIG. 2 illustrates an example signal flow of successive ISI cancellation for a CDMA system.

The foregoing descriptions on ML demodulations apply to CDMA systems as well. For a CDMA system, descrambling and despreading operations need to be performed prior to ML demodulation. FIG. 2 illustrates an example signal flow of successive ICI cancellation for a CDMA system. FIG. 2 contains all operations in FIG. 1. Note that for a CDMA system, it is more appropriate to refer to the ISI as the ICI. Accordingly, ISI reconstructor 112 in FIG. 1 now becomes ICI reconstructor 212 in FIG. 2. In FIG. 2, MIMO equalizer 102 equalizes incoming signal r(n) to suppress ICI. The equalization is performed at chip-level. Descrambling/despreading apparatus 202 performs descrambling and despreading operations on the equalizer output, or post-cancellation signal if the reconstructed ICI is nonzero, to transform chip-level signals to symbol-level signals. During reconstruction of the ICI, spreading/scrambling apparatus 204 performs spreading and scrambling operations on the output of MIMO demodulator 110, to transform the symbol-level signals to chip-level signals.

It should be noted that after descrambling and despreading, the statistical properties of the signal remain in the same form as Eqs. (4), (5), and (6), although certain parameters in those equations may be different due to the spreading gain and power allocations to various code channels.

It is to be understood that it is possible to perform descrambling and despreading operations on incoming signal r(n), and then perform equalization at symbol level. Accordingly, spreading/scrambling apparatus 204 may not be needed. The preferred order of operations may depend on implementations.

Oversampling

If there is non-negligible signal energy beyond the half-symbol-rate (or half-chip-rate) frequency, oversampling, i.e., sampling with more than one sample per symbol, can be employed to improve the performance. The descriptions below illustrate how oversampling counterparts of Eqs. (4), (5), and (6) can be obtained using 2× oversampling as an example.

A 2× sampled signal r(n) can be decomposed into two symbol-rate signals $r_1(n)=r(2n)$ and $r_2(n)=r(2n+1)$. Accordingly, the MIMO channel H(n) can be decomposed into two symbol-rate sub-channels: $H_1(n)=H(2n)$ and $H_2(n)=H(2n+1)$. Thus $$r_1(n)=(H_1 * x)(n)+u_1(n)$$

$$r_2(n)=(H_2 * x)(n)+u_2(n)$$

Two symbol-rate sub-equalizers $W_1(n)$ and $W_2(n)$ can be designed according various criteria, such as MMSE or ZF, such that $$s(n) = (W_1 * r_1 + W_2 * r_2)(n) \quad (12)$$
$$= ((W_1 * H_1 + W_2 * H_2) * x)(n) +$$
$$(W_1 * u_1 + W_2 * u_2)(n)$$
$$= G(0)x(n) + v(n)$$

where $G(n)=(W_1 * H_1 + W_2 * H_2)(n)$. The noise v(n) is given by $$v(n) = \sum_{k \neq 0} G(k)x(n-k) + (W_1 * u_1 + W_2 * u_2)(n) \quad (13)$$

The covariance matrix of v(n) is $$C = \frac{E_S}{M} \sum_{k \neq 0} G(k)G^H(k) + N_0 \sum_k W_1(k)W_1^H(k) + W_2(k)W_2^H(k) \quad (14)$$

Eqs. (12), (13), and (14) are now the 2× sampled counterparts of Eqs. (4), (5), and (6). Note that the definitions of G(n) in Eq. (4) and in Eq. (12) are different.

CONCLUSION, RAMIFICATIONS, AND SCOPE

Accordingly, it will be seen that ML MIMO demodulation in a frequency-selective channel makes it possible to close the performance gap between a linear equalizer with slicing and an optimum ML demodulator. The noise in the output of a linear equalizer can be highly correlated, thus preventing direct application of ML or near-ML MIMO demodulations. This problem is overcome by first establishing the equivalent post-equalization MIMO channel and the noise co-variance matrix and then de-correlating the noise. Further performance improvement is made possible by reducing residual ISI or ICI through use of SIC.

Various aspects described herein apply to general communications systems having wide-band signals going through frequency-selective channels. They also apply to CDMA systems that comprise a plurality of code channels that have a wide frequency bandwidth.

While various aspects or features have been illustrated and described herein, many modifications, substitutions, changes, and equivalents will now occur to those skilled in the art. It is, therefore, to be understood that the appended claims are intended to cover all such modifications and changes as fall within the true spirit and the scope of the disclosed subject matter.

What is claimed is:

1. A method for multi-input, multi-output (MIMO) communications, comprising:
   (a) equalizing an MIMO signal with an equalizer, said MIMO signal coming from a frequency-selective MIMO channel,
   (b) computing an equivalent MIMO channel for an equalizer output, said equivalent MIMO channel including said frequency-selective MIMO channel and said equalizer, and said equalizer output being the output of said equalizer,
   (c) computing a noise covariance matrix of said equalizer output according to said equivalent MIMO channel,
   (d) square-root decomposing said noise covariance matrix to obtain a de-correlation matrix,
   (e) applying said de-correlation matrix to said equalizer output to generate a de-correlated MIMO signal, and
   (f) applying MIMO demodulation to said de-correlated MIMO signal,
   whereby said de-correlated signal has de-correlated noises.

2. The method of claim 1, wherein said MIMO demodulation is maximum-likelihood.

3. The method of claim 1, wherein said MIMO demodulation is near-maximum-likelihood.

4. The method of claim 1, wherein said equalizer is minimum mean-squared error (MMSE).

5. A method for MIMO communications in a code-division multiple access (CDMA) system, comprising:
   (a) equalizing an MIMO signal with an equalizer, said MIMO signal coming from a frequency-selective MIMO channel, (b) computing an equivalent MIMO channel for an equalizer output, said equivalent MIMO channel including said frequency-selective MIMO channel and said equalizer, and said equalizer output being the output of said equalizer, (c) computing a noise covariance matrix of said equalizer output according to said equivalent MIMO channel, (d) square-root decomposing said noise covariance matrix to obtain a de-correlation matrix, (e) descrambling and despreading said equalizer output to generate a symbol-level signal;

(f) applying said de-correlation matrix to said symbol-level signal to generate a de-correlated MIMO signal, and (g) applying MIMO demodulation to said de-correlated MIMO signal, whereby said de-correlated signal has de-correlated noises.

6. The method of claim 5, wherein said MIMO demodulation is maximum-likelihood.

7. The method of claim 5, wherein said MIMO demodulation is near-maximum-likelihood.

8. A method for MIMO communications, comprising:
(a) equalizing an MIMO signal with an equalizer, said MIMO signal coming from a frequency-selective MIMO channel, (b) computing an equivalent MIMO channel for an equalizer output, said equivalent MIMO channel including said frequency-selective MIMO channel and said equalizer, and said equalizer output being the output of said equalizer, (c) subtracting a reconstructed interference from said equalizer output to obtain a post-cancellation signal, said reconstructed inference being set to zero initially, (d) computing a noise covariance matrix of said post-cancellation signal, (e) square-root decomposing said noise covariance matrix to obtain a de-correlation matrix, (f) applying said de-correlation matrix to said post-cancellation signal to generate a de-correlated MIMO signal, (g) applying MIMO demodulation to said de-correlated MIMO signal, (h) reconstructing said reconstructed interference from said MIMO demodulation of said de-correlated MIMO signal, and (i) repeating steps (a) to (h) as many times as necessary, whereby after step (i), the performance of MIMO demodulation can be further improved.

9. The method of claim 8, wherein reconstructing said reconstructed interference further comprises:
(a) decoding the output of said MIMO demodulation to generate a decoded signal, (b) re-encoding said decoded signal to generate a re-encoded signal, and (c) generating said reconstructed interference from said re-encoded signal.

10. A method for MIMO communications in a CDMA system, comprising:
(a) equalizing an MIMO signal with an equalizer, said MIMO signal coming from a frequency-selective MIMO channel, (b) computing an equivalent MIMO channel for an equalizer output, said equivalent MIMO channel including said frequency-selective MIMO channel and said equalizer, and said equalizer output being the output of said equalizer, (c) subtracting a reconstructed interference from said equalizer output to obtain a post-cancellation signal, said reconstructed inference being set to zero initially, (d) computing a noise covariance matrix of said post-cancellation signal, (e) square-root decomposing said noise covariance matrix to obtain a de-correlation matrix, (f) descrambling and despreading said post-cancellation signal to generate a symbol-level signal;

(g) applying said de-correlation matrix to said symbol-level signal to obtain a de-correlated MIMO signal, (h) applying MIMO demodulation to said de-correlated MIMO signal, (i) reconstructing said reconstructed interference from said MIMO demodulation of said de-correlated MIMO signal, and (j) repeating steps (a) to (i) as many times as necessary, whereby after step (j), the performance of MIMO demodulation can be further improved.

11. The method of claim 10, wherein reconstructing said reconstructed interference further comprises:
(a) spreading and scrambling the output of said MIMO demodulation to generate a spread and scrambled signal, and (b) generating said reconstructed interference from said spread and scrambled signal.

12. The method of claim 10, wherein reconstructing said reconstructed interference further comprises:
(a) decoding the output of said MIMO demodulation to generate a decoded signal, (b) re-encoding said decoded signal to generate a re-encoded signal, and (c) spreading and scrambling said re-encoded signal to generate a spread and scrambled signal, and (d) generating said reconstructed interference from said spread and scrambled signal.

* * * * *